Patented Mar. 25, 1924.

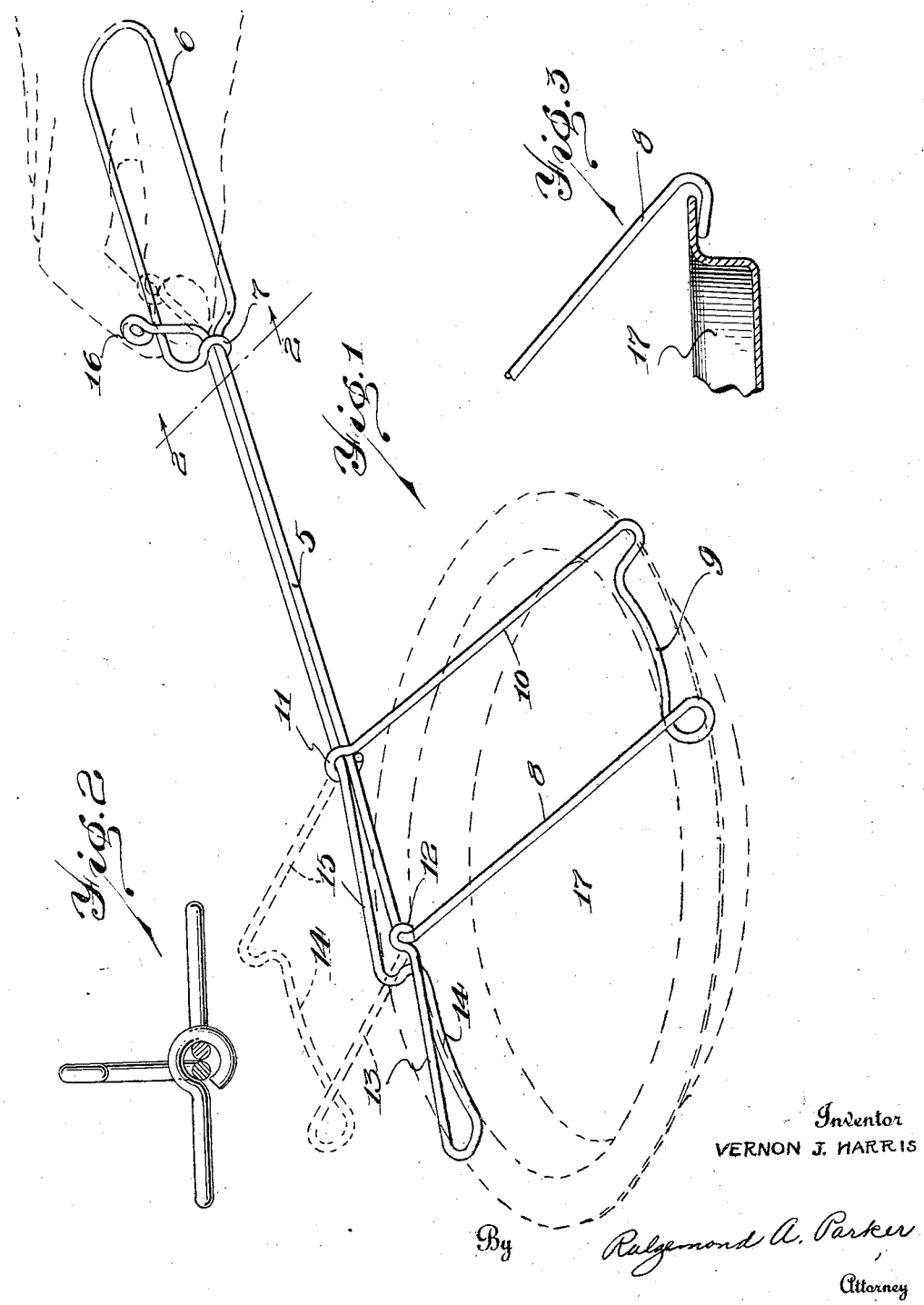

1,487,739

UNITED STATES PATENT OFFICE.

VERNON J. HARRIS, OF ADRIAN, MICHIGAN.

PAN OR PLATE LIFTER.

Application filed April 5, 1922. Serial No. 549,854.

*To all whom it may concern:*

Be it known that I, VERNON J. HARRIS, citizen of the United States, residing at Adrian, county of Lenawee, State of Michigan, have invented a certain new and useful Improvement in Pan or Plate Lifters, and declare the following to be a full, clear, and exact description of the same, such as will enable others skilled in the art to which it pertains to make and use the same, reference being had to the accompanying drawings, which form a part of this specification.

My invention relates to improvements in pan or plate lifters. The object is to provide a simple, inexpensive, efficient household utensil of the character described adapted to engage underneath the edge of a pan, plate or other similar article to remove the same from one plate to another, particularly in or out of a heated oven.

The invention resides in the particular construction hereinafter described and claimed of the article above referred to, and the above and other objects, together with the details of construction, will more fully appear in the following description, appended claims and accompanying drawing, in which:

Fig. 1 is a perspective showing my lifter, in solid line, engaging a pan, and in dotted line, the lifter appears in the release position.

Fig. 2 is a sectional elevation taken on the line 2—2 of Fig. 1.

Fig. 3 is a fragmentary perspective showing the engagement of one of the lifter jaws under the edge of the pan.

My improved lifter comprises two relatively movable elements or gripping jaws pivotally connected together for relative rotatability so as to grip a pan or plate between them in such a manner as to support such pan for removal from one place to another and adapted to be relatively moved so as to release such supported pan or plate when desired.

I prefer to construct each of these elements from a single piece of wire. The large element is shown as formed of a single wire comprising a handle portion 5 bent upon itself at one end to form a hand grip portion 6. The end of the wire forming the hand grip portion is looped loosely around the handle wire as at 7. At the opposite end of the handle the wire is bent laterally as at 8 and again bent to form a concavo-convex portion 9 which is first turned inwardly toward the handle and then back substantially longitudinally the handle and is bent in toward the handle as at 10 substantially parallel the portion 8, and looped loosely around the handle as at 11. This constitutes one of the gripping jaws which is integral and rigid for all practical purposes with the handle, the handle itself possessing sufficient rigidity to support a plate or pan.

The other element or gripping jaw member is likewise preferably constructed of a single wire looped at the outer end as at 12 over the handle 5 of the first member and extended laterally as at 13 away from the handle and bent back lengthwise the handle, forming a concavo-convex portion 14 similar to the concavo-convex gripping edge of the first member and then turned inwardly, laterally, toward the handle as at 15. From this laterally-extending gripping jaw portion just described, the wire of which this element is formed is extended lengthwise the handle through the loop 11 and through the loop 7 and then bent angularly to form an operating lever 16 disposed in proximity to the hand grip portion of the handle for operation. It will be observed that the handle portion of the first-mentioned member is bent slightly at the pivot point 11 so that the pivotal supports at 7—11 and 12 of such member are on a line.

The operation of the device is apparent from the above description of its construction. The hand grip portion is engaged by one hand of the operator and by rocking the rotatable jaw member, by actuating the lever 16, it is possible to engage the two opposed gripping jaws over the edge of a pan 17 or release them therefrom.

What I claim is:

1. In a device of the class described, a pair of cooperating, relatively movable, pivotally connected elements, one of which elements is formed of a single wire looped upon itself at one end to form a gripping jaw and bent at the other end to form a hand grip portion, said other element also formed of a single wire bent at one end to form a jaw corresponding to the jaw of said first element and pivoted to the handle portion of said first element for relative rotatability thereabout to move the jaw thereof toward or away from the jaw of said first element.

2. In a device of the class described, in combination, a pair of co-operating relatively movable elements, one of said elements being constructed of a single wire and consisting of a handle having a hand grip portion at one end and a laterally directed jaw portion at the opposite end, the other element being also constructed of a single wire and comprising a jaw portion at one end adapted to co-operate with the jaw portion of said first element, and an actuating portion extending longitudinally the handle of the first element and pivoted to said first element for relative rotatability to move the jaw thereof toward or away from the jaw of said first element and provided with an actuating lever disposed in proximity to the hand grip portion of said first element.

3. In an article of the class described, in combination, a member formed of a single wire comprising a handle looped upon itself at one end to form a hand grip portion and looped backwardly upon itself at the opposite end to form an angularly-disposed gripping jaw and the end of the wire forming such jaw being looped loosely around the handle, a second member formed of a single wire consisting of an actuating portion extending lengthwise the handle of the first member and passing freely through the loop thereover of the hand grip portion thereof and through the loop at the opposite end of the jaw portion thereof and then bent to form an angularly-disposed jaw portion corresponding to the jaw of the first member and adapted to be rotated to move the jaw thereof toward or away from the jaw of said first member.

4. In a lifter of the class described, a pair of pivotally connected gripping members, one of which members consists of a handle having a hand grip portion at one end and a laterally-directed gripping jaw at the opposite end, said other member comprising a jaw portion corresponding to the jaw of said first member and adapted to be moved toward or away from said jaw of the first member, and an operating lever portion extending lengthwise the handle of said first member and disposed for operation in proximity the hand grip portion of said first member.

In testimony whereof, I sign this specification.

VERNON J. HARRIS.